PROCESS FOR MANUFACTURING MULTILAYER CERAMIC CAPACITORS

Original Filed Sept. 6, 1962 4 Sheets-Sheet 1

INVENTORS
ANTONIO R. RODRIGUEZ
JOHN CRONIN
BY Dean, Fairbank & Hirsch
ATTORNEYS

PROCESS FOR MANUFACTURING MULTILAYER CERAMIC CAPACITORS

Original Filed Sept. 6, 1962 4 Sheets-Sheet 2

INVENTORS
ANTONIO R. RODRIGUEZ
JOHN CRONIN
BY Dean, Fairbank & Kirsch
ATTORNEYS

PROCESS FOR MANUFACTURING MULTILAYER CERAMIC CAPACITORS

Original Filed Sept. 6, 1962 4 Sheets-Sheet 3

INVENTORS
ANTONIO R. RODRIGUEZ
JOHN CRONIN
BY Dean, Fairbank & Hirsch
ATTORNEYS

INVENTORS

ANTONIO R. RODRIGUEZ
JOHN CRONIN

BY Dean, Fairbank & Hirsch

ATTORNEYS

United States Patent Office

Re. 26,421
Reissued July 2, 1968

26,421

PROCESS FOR MANUFACTURING MULTILAYER CERAMIC CAPACITORS

Antonio R. Rodriguez, Franklinville, and John Cronin, Bolivar, N.Y., assignors to Aerovox Corporation, New Bedford, Mass., a corporation of Massachusetts Original No. 3,235,939, dated Feb. 22, 1966, Ser. No. 221,855, Sept. 6, 1962. Application for reissue Apr. 21, 1966, Ser. No. 548,025
7 Claims. (Cl. 29—25.42)

Matter enclosed in heavy brackets [ ] appears in the original patent but forms no part of this reissue specification; matter printed in italics indicates the additions made by reissue.

The present invention relates to a multilayer capacitor and it particularly relates to a multilayer capacitor with alternate layers of dielectric and metal.

The present invention is to provide a novel process for making a multilayer capacitor which will form a rugged integral structure and will aid in obtaining extreme miniaturization and high reliability.

Another object is to provide a novel method of making capacitors, particularly designed for air-borne and space-borne equipment, in which space, economy, reliability and ruggedness are most desirable, and in which very thin sections may be employed without difficulty because of brittleness.

Still another object of the present invention is to provide a method of manufacturing a ceramic capacitor of extremely small size as compared to the capacity rating.

In accomplishing the above objects, it has been found most desirable to utilize ceramic materials having high dielectric constants, particularly mixtures of titanates, zirconates, stannates of the alkali earth metals, such as calcium, barium and strontium as well as titanium dioxide. It is also possible to use ceramic materials of low dielectric constant as alumina, steatite and other silicates for lower dielectric constants. In the manufacture of these extremely compact capacitors the following steps are taken.

Firstly, thin flexible sheets of ceramic composition containing a plastic binder are formed in strip form from a slip devoid of bubbles and air holes, by casting. All such bubbles and pin holes caused by air or other gases must be removed from the slip prior to the casting operation.

Secondly, the thin flexible ceramic sheets in strip form thus formed by the casting are electroded or painted on both sides with a refractory metal which does not oxidize at the firing temperature of the ceramic composition. The electroding is repeated at spaced intervals on the strips so that the electroded sheets may be punched out of the strip into a stack singly or in a multiple die.

The sheets, previously placed on top of one another in proper alignment, may also be punched in a multiple die.

The metallic electroding material is deisrably formed of finely divided particles of palladium, platinum or other non-oxidizable metals.

Where one strip is punched, the shape and pattern of the electrode along the strip varies alternately so that each cut sheet will have its electrode pattern repeated only at every second position.

Where two strips are punched, the alternating top faces and the bottom faces of the multiple strip may carry in superimposed position the matching alternating pattern. The same patterns will be superimposed on the contacting faces, so that the electrode will be of double thickness at the contacting faces.

These finely divided metallic materials are suspended in a vehicle with a binder and the suspension is applied to the opposite sides of the thin flexible ceramic sheet by offset printing, spraying, painting with a brush or by a squeegee-screen method.

The pattern or shape of the application of the metallizing will vary so that each alternate electrode will have the same shape and area on the contacting faces and out of register with the facing electrodes on the next contacting faces, the pattern or shape will depend upon the final shape and size of the capacitor as well as on the position for outside circuit connections to the different elements or sheets of the capacitor.

As the next step the electroded sheets, after drying, are punched in a die of the desired size and shape at proper location around the electrode, and as many sheets are punched as may be required to make the capacity by parallel connection of the elements. Each alternate electrode will have an exposed edge or element at the same cut edge away from the exposed edges of the intervening electrodes at another exposed edge or face, each set of contacting faces forming an electrode.

After the required number of sheets have been punched in a die in a stack, without removal of the pieces from the die, the punch or punches are brought to bear upon the stacked pieces in the die at a pressure of about 10 to 20 tons per square inch.

As a result, the sheets with their electrodes are compressed into an integral solid structure having great ruggedness after firing.

As an alternative process, which is less preferred, each sheet may be separately punched in square, rectangular or circular shape, then electroded or metallized, with matching patterns on contacting faces alternating in shape and location at the successive contacting faces, and then transferred to another die of the same shape and dimensions for compacting.

The structure is finally ejected from the die and then is metallized by painting or otherwise covering with metal particles at the necessary edges or surfaces to complete the parallel connection.

The same metal may be utilized as has been utilized for application to the sides or faces of the sheets for electroding.

Although this last-mentioned metallizing before firing may be eliminated and silver used after firing for both the parallel connections and connecting the leads, for the sake of economy, it is desirable to obtain more reliable connections by first metallizing before firing. The parallel connection if desired can be made in the green state with the same material as the electrodes and then after firing the additional silver may be applied to insure the connection and make it more reliable.

Pieces are then fired at the maturing temperature, varying with the exact composition, ranging between 2,100° F. and 2,600° F. Next, the fired pieces are silvered at terminations of the electrodes and the leads soldered on as usual. Finally, the unit may be given a protective insulating coating.

The desired form of the capacitor may be square, rectangular or circular and the sheets may be employed with or without margins. Various irregular shapes may also be employed to fit the unit in which the capacitor is to be utilized and these shapes may have side notches to accommodate locating members.

In the drawings:

FIG. 7b is a bottom view of the electrode strip of FIG. 7a;

The process of forming the sheets from a ceramic mix is described in Patent No. 3,004,197 of Antonio R. Rodriguez and Arthur B. Wallace.

The process may be summarized as follows:

The ceramic mix from which the sheets are made contains the ceramic powder, for example, calcium and barium titanate and zirconate slurried in an aqueous or organic liquid in which composition it is mixed with binders such as polyvinyl alcohol and deflocculants, such as lignates or alginates.

The slip is freed of bubbles and airholes by de-airing as by subjecting it to a vacuum before casting and formation into a sheet.

The de-airing may be accomplished in a dispersion machine under a vacuum of 28" while the material is a slurry before casting into layers, while at same time breaking up all agglomerates.

The slurry is the cast on a smooth impervious surface, is left to dehydrate or dried in an oven to form a coherent flexible sheet which may be handled and punched with the binder holding the particles together.

The sheets when formed will carry about 8 to 15% of polymer binder which is usually polyvinyl alcohol.

Sheets may be from 1 mil to 12 mils when fired and from 1.25 mils to 15 mils before the shrinkage which occurs in firing.

The metallizing is desirably accomplished, as for example, by screen or spraying from a suspension of the platinum or palladium or other noble metal, which can withstand the firing temperature without melting or oxidizing.

The platinum or palladium is finely dispersed in a fineness of 1 to 10 microns in an organic solvent having a high boiling point such as butyl Cellosolve or Carbitol acetate in presence of an organic binder.

The sheet desirably is in continuous form and may be rolled up and then unrolled for metallizing and punching.

In the embodiments described, individual sheets or strips are shown for purpose of illustration.

Figure 1:
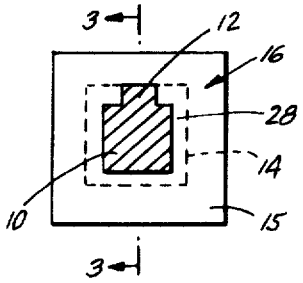
FIG. 1 is a diagrammatic top plan view showing the top side of one of the sheets or strips making up the stack with margins.
Figure 2:
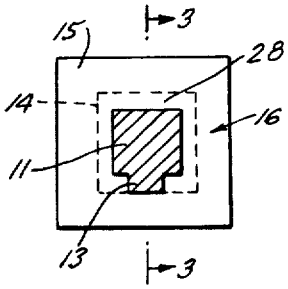
FIG. 2 is a bottom plan view of the sheet or strip diagrammatically shown.

Referring to the embodiment of FIGS. 1 to 6 as applied to a multilayer capacitor with a margin, the thin sheet 16, which has been prepared without bubbles, pinholes or the like, is shown in top side in FIG. 1 and in bottom side in FIG. 2. The sheet or strip 16 of FIG. 1 is metallized on its top side, as indicated at 10, and at its bottom side as indicated at 11, with the oppositely extending tabs 12 and 13 for parallel connections.

The pattern is repeated on each contacting face and alternated on each opposite face.

The punch line is indicated by the dotted lines 14 in FIG. 1 and FIG. 2. Desirably, the electrode consisting of the square 10 with projecting tab 12 on the top side of FIG. 1 and square 11 with projecting tab 13 on the bottom side of FIG. 2 are formed by metallizing with palladium.

After application of the metal on both sides on each sheet or on a continuous strip, as indicated by electrode 10–12 on the top side and electrode 11–13 on the bottom side, the coating is dried at room temperature or in an oven at about 60 to 80 degrees.

The ceramic strips or sheets are then punched either singly or in multiples to remove the material 15 outside of the dotted lines 14 of FIGS. 1 and 2.

Figure 3:
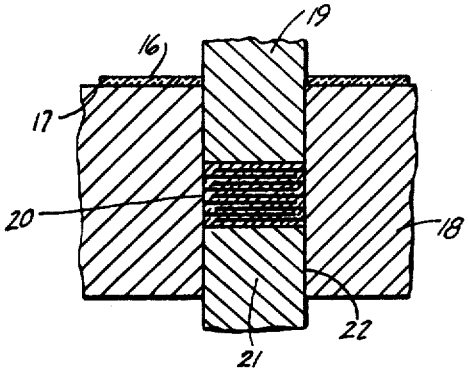
FIG. 3 is a transverse sectional view upon the line 3—3 of FIGS. 1 and 2 showing the sheets stacked.

The ceramic sheet strip 16 consisting of a continuous series of sheets as shown in FIGS. 1, 2 and 3, is placed on the top face 17 of a die 18 and the upper punch 19 will punch out successive units along the punch line 14 to form the stack 20 against the lower punch 21 in the die recess 22. The tabs 12 and 13 will project forwardly and backwardly toward opposite sides of the die cavity 22 alternately and these tabs will be cut off flush with the side of the stack.

In the stack of FIG. 3, when formed and compressed, which is removed from the device of FIG. 3, there are a series of tabs corresponding to tabs 12 and 13, the ends of which project at opposite sides, as indicated at 23 and 24.

In the die 18, the sheets or strips are punched either singly or in multiples, leaving side margins 28 as shown in FIGS. 1 and 2.

The number of sheets to be punched simultaneously in the stack depends upon the thickness of each sheet.

The sheets are so placed in the final stack after punching that the tab ends 23 and 24 will be in proper position for application of the metallizing, silver or other conductive material.

Figure 4:
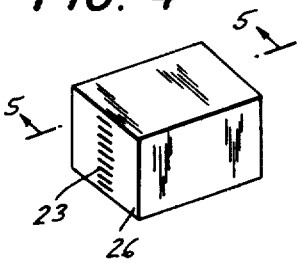
FIG. 4 is a top diagrammatic perspective view showing the stacked sheets after compression and removal from the die.
Figure 5:
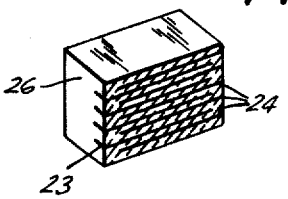
FIG. 5 is a transverse sectional perspective view taken upon the line 5—5 of FIG. 4.
Figure 6:
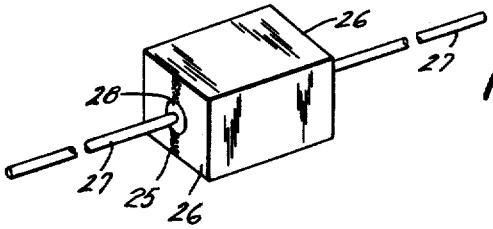
FIG. 6 is a top perspective view showing the completed ceramic capacitor with leads connected thereto.

The final stack, as indicated in FIGS. 4 and 5, may have been pressed together under a pressure of about 10 to 20 tons per square inch in the die 18 and sheets may each have a thickness of 0.003" with the final structure as indicated in FIGS. 4, 5 and 6, having the various sheets of FIGS. 1 and 2 substantially integrated.

At the end faces 26 only the edges 23 and 24 of the opposite connection tabs will be available formed from the elements 12 and 13 of FIG. 1 and FIG. 2.

The piece, as shown in FIG. 4, will be fired at a temperature of about 2,100 to 2,600° F. to become a hard rigid block of dielectric with intervening alternating electrodes 10–12 and 11–13.

The metallizing strip 25 applied to the fired block may be of silver. The leads 27 will be soldered in position, preferably by solder 28 against the strip 25.

The insulating covering may be formed around the final block of FIG. 6.

This will give a multilayer miniature capacitor with the dielectric margins 28 inside of the cutting lines 14 forming a protective marginal envelope.

Desirably, the top and bottom sheets are not metallized at all or are only metallized on their inside faces so that all the electrodes will be embodied and embedded in the block.

FIGS. 7a to 10 show a multilayer capacitor without margins. By eliminating the margins, indicated in FIGS. 1 and 2, at 28, the unit may be made more compact and the process more amenable to mechanization.

The elimination of the side margins in FIGS. 7a to 10 increases the capacitive area by that amount so that a higher capacity per unit volume can be obtained than the units of FIGS. 1 to 6 described with margins all around. Such a design will also allow calibration of capacity.

The insulating gap is the thickness of the dielectric itself and is not critical for low voltage units.

Figure 7A:
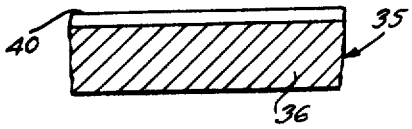
FIG. 7a is a diagrammatic top view of a metallized ceramic sheet showing another embodiment.
Figure 7B:
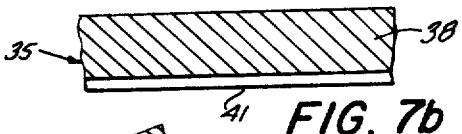

In this particular type of structure, in FIG. 7a the ceramic strip 35 has a metallized coating or electrode 36 with a margin 40 along the top edge and as shown in FIG. 7b, the metallized surfacing or electrode 38 will be placed on the other side of the sheet of strip so that the margin 41 will be along the bottom edge of the sheet or strip. The metallizing material at 36 and 38 may be a noble metal such as palladium.

Figure 8:
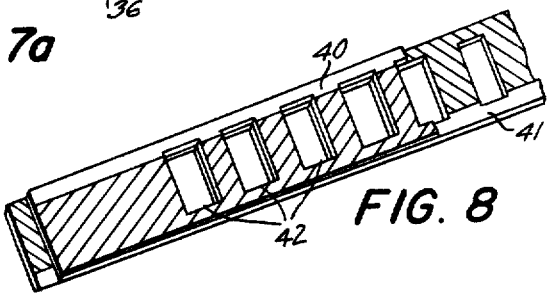
FIG. 8 is a diagramamtic top perspective view indicating how the sheets as electroded in FIGS. 7a and 7b may be stamped in multiples.

These strips are then superimposed upon one another so that the margins 40, 41 will alternate on opposite sides as clearly shown in FIG. 8. The superimposed strips in a pair of multiples of two may be punched as indicated at 42 and compressed to form the stack as indicated in FIG. 9.

Figure 9:
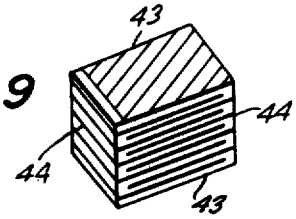
FIG. 9 is a diagramamtic top perspective view showing the stacked sheets after punching out, stacking and compression.
Figure 10:
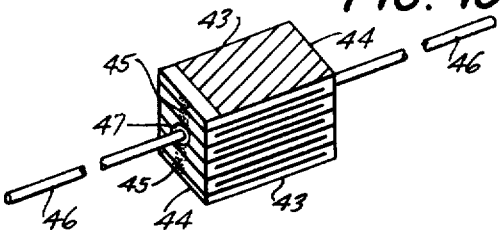
FIG. 10 is a top perspective view of the completed capacitor.

In the arrangement shown in the stack of FIG. 9, the alternative electrodes will all be exposed on the opposite sides of the block at 43 but only alternatively at the opposite sides 44 where the margins 40 and 41 exist and after stacking, compression and firing, the metallized strip at 45, in FIG. 10, may then be applied to give parallel connections on the opposite sides 44 of the block and the leads 46 may be attached by solder 47.

A porcelain glaze or one of the usual resins of the epoxy, silicone or phenolic type may be used to enclose the block. Such a good adherent coating will also help prevent arcing between the layers because of the absence of sufficient insulating margins at higher voltages at the sides 43 of the block.

Figure 11:
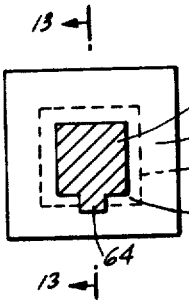
FIG. 11 is a top plan view of an electroded ceramic sheet for use in an alternative embodiment.
Figure 12:
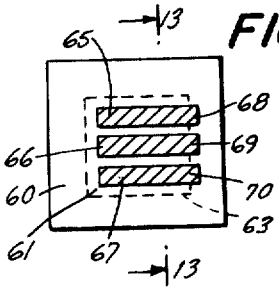
FIG. 12 is a bottom plan view of the sheet of FIG. 11, with separate metallized portions.

In the form shown in FIGS. 11 to 16, the sheets or plates 60 are provided with the margins 61 and the central metallized electrode surfacing 62 with the projecting tabs 64 on the top side, shown in FIG. 11.

This tab will project beyond the punch line 63 so that it will be exposed at its edge when the die cut is performed. This electrode surfacing, as indicated at 62, is applied on the top side of the even sheets and the bottom side of the odd sheets.

At the top side of the odd sheets and bottom side of even sheets, there will be applied three parallel electrodes, 65, 66 and 67, matching on contacting faces, having the tabs or projecting portions 68, 69 and 70 beyond the punch line or die cut line 63. The metallizing material, such as palladium, may form the electrodes 62 on one side and 65, 66 and 67 on the other side.

Figure 13:
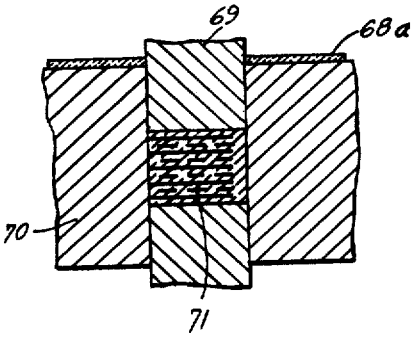
FIG. 13 is a transverse sectional view taken upon the line 13—13 of FIGS. 11 and 12 of the sheets stacked in a punching die.

The applied metallizing preparation is dried at 80° to 100° C. and the stack 71, which is formed in FIG. 13 from the ceramic strip 68a by the punch 69 acting through the die 70 after compression, is fired to a maturing temperature after ejection from the die 70. The tabs 64, and electrodes 68, 69, and 70 are placed on adjacent sides 72, 73 respectively of the block 74 as shown in FIG. 4.

Figure 14:
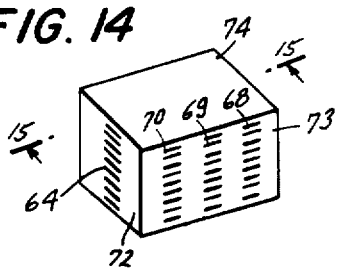
FIG. 14 is a top perspective view of a stack according to the arrangement of FIGS. 11 to 13 showing the position of the exposed electrodes on different sides of the stack.
Figure 15:
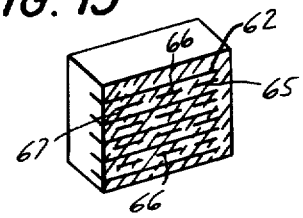
FIG. 15 is a transverse sectional view taken upon line 15—15 of FIG. 14 showing the interior position of the electrodes.

The pressure of 10 to 20 tons per square inch before firing will form a substantially integral structure as indicated in FIG. 14 and the electrodes 62 will alternate with the electrodes 67, 66 and 65, as shown in the section in FIG. 15.

Figure 16:
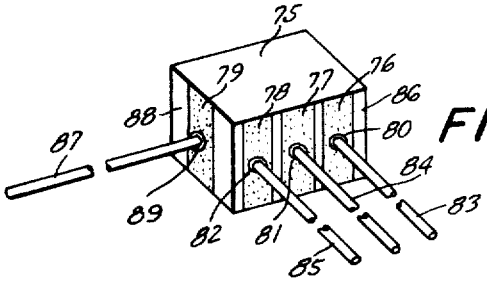
FIG. 16 is a top perspective view showing the completed capacitor.

The fired piece 75 in FIG. 16 will be a hard rugged integral block of dielectric with metallized strips 76, 77, 78 and 79 forming a connection on the exterior of the block between the electrode ends. The solder 80, 81 and 82 attached to the strips 76, 77 and 78 will enable attachment of leads 83, 84, 85 at the side 86. The solder 89 will attach the lead 87 at the side 88.

The number of capacitors that may be placed in a single block, as shown in FIG. 16, may widely vary and the arrangement of tabs and their relationship to each other is not limited in any way.

In the arrangement shown in FIGS. 17 to 25, the sheets 100 are metallized in a circular pattern 101 on their top side extending outside of the circular punch line 102 with an inside margin 103.

Figure 18:
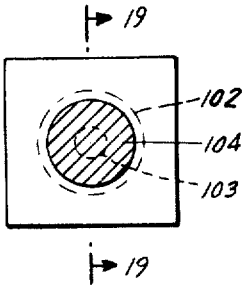
FIG. 18 is a bottom plan view of the sheet of FIG. 17.

On the opposite bottom side as shown in FIG. 18, the electrode area 104 will be inside of the punch line 102 and will cover the central margin 103. These patterns will be repeated in alternating fashion on the successive contacting faces. The two sheets that serve as the outside or cover plates receive the electrode surfacing only on those faces which are to be on the inside of the stack in this feed-through capacitor.

Figure 17:
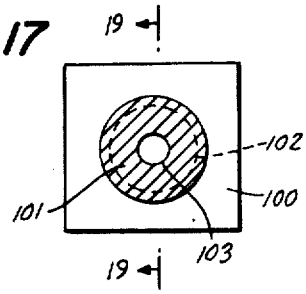
FIG. 17 is a diagramamtic top plan view of a condenser sheet element of still another embodiment.
Figure 19:
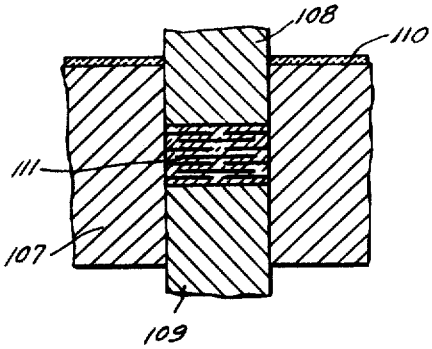
FIG. 19 is a transverse vertical sectional view taken on the line 19—19 of FIGS. 17 and 18 of the stacked sheets, showing the stack in a punch operation.
Figure 20:
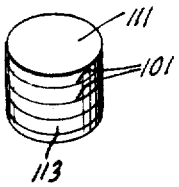
FIG. 20 is a top diagrammatic perspective view showing the stack of compressed punched-out sheet elements formed by the punching operation of FIG. 19.

The die 107 of FIG. 19 has the upper punch 108 and the lower punch 109, and the strips 110, carrying the electrodes as shown in FIGS. 17 and 18, may be punched either singly or in multiples to form a stack 111. The electrodes 101 will project to the outer face, as indicated in FIG. 20, whereas the electrodes 104 will not project out to the outer surface or punch line 102.

The overlap between the punch line 102 and the electrode pattern 101 assures that the metallizing 101 will be exposed on the outside surface. The punching by upper die 108 from strip 110 may take place either from single sheets 110 or from multiple sheets 111 carrying the electrodes 101 and 104 on opposite sides. The stack is then compressed in the die.

Figure 21:
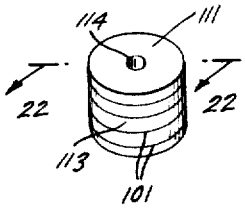
FIG. 21 is a top diagrammatic perspective view similar to FIG. 20 of the stack with a central hole or opening punched therethrough.

The stack 111 after ejection from the die 107 is then placed in a jig so that in FIG. 21 the entire unit will be located and supported to permit a hole to be drilled through the center of the green ceramic, as indicated at 114. Then the compressed stack 111 is fired to maturing temperature in the range of 2,000 to 2,600° F. to become a hard rugged and integral block of dielectric with intervening electrodes as shown in FIG. 22.

The hole size is such that it will not touch the electrode 101 of FIG. 17, but will cut directly through the central portion of the electrode 104 of FIG. 18.

After compression and firing, the connection between the electrodes 101 may be made on the outside 113 of the stack 111 in FIG. 21 while the connection between the electrodes 104 may be made on the inside of the hole or central opening 114.

Figure 22:
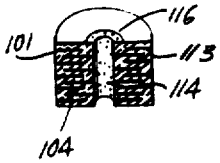
FIG. 22 is a side sectional view taken upon line 22—22 of FIG. 21, showing the application of a metallized coating upon the central opening.
Figure 23:
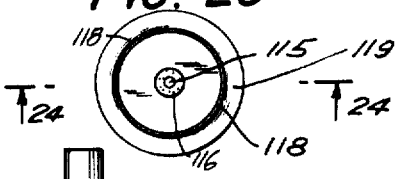
FIG. 23 is a diagrammatic top plan view of the stack of FIG. 24 with a central lead applied to the central hole in the periphery and with the casing in position around the stack.

In FIG. 22 is shown the compressed and fired piece which becomes a hard rugged integral block of dielectric with intervening electrodes 101 and 104 alternating with one another, the electrodes 104 being exposed on the inside at the hole 114, while the electrodes 101 are exposed on the outside at 113.

Both the outer circumference 113 as well as the interior face of the hole 114 may be metallized with the same suspension as used to make the electrodes 101 and 104 followed by drying in an oven at 80° C., prior to firing of the stack.

The projecting exposed edges of the electrodes 101 will be connected at the outside 113 of the block and the interior electrodes will be connected at the inside of the hole 114 for making parallel connections. The inside electrode is extended to the top and bottom plate in a circular pattern 116 to make contact with the central lead.

Figure 24:
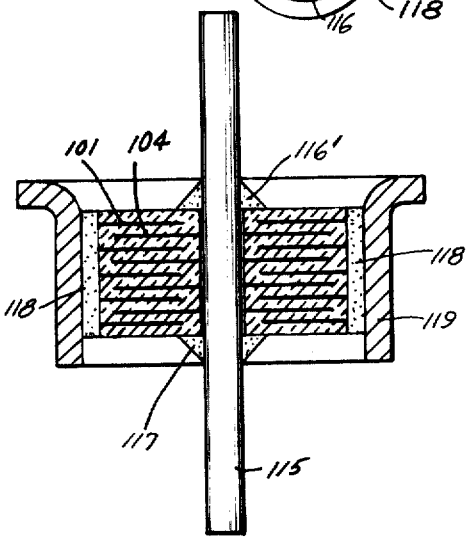
FIG. 24 is a transverse vertical sectional view taken upon the line 24—24 of FIG. 23 showing the interior structure of the unit of FIG. 23 upon an enlarged scale as compared to FIG. 23.
Figure 25:
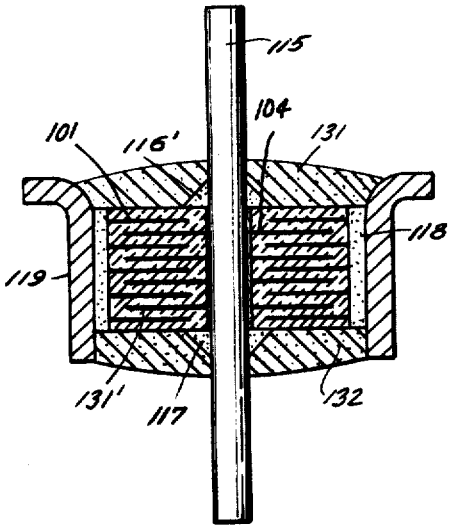
FIG. 25 is a transverse sectional view similar to FIG. 24 with the potting compound in position.

As indicated in FIGS. 24 and 25, there may be a central lead 115 soldered in position at 116' and 117 to form a connection to the alternating inside electrodes 104. The outside soldering 118 will esablish connections between the parallel outer electrodes 101 and the casing 119 as shown in FIG. 24.

A metal casing 119 is placed around the entire unit, and is electrically connected to the solder 118 and therefore to the outer edges of the electrodes 101.

In FIG. 25, the pile 131' will be protected by the potting compound 131 and 132 respectevely at the top and bottom of the metal casing 119.

The solder 118 at the outside will connect the outer edges of the electrodes 101 to the can 119 while the lead 115 with its solder connections 116' and 117 may establish connections to the inside edges of the electrode 104. The unit, as shown in FIGS. 17 to 25, is a multilayer feed-through capacitor.

To summarize, the unit shown in FIGS. 1 to 6 is a multilayer capacitor with a side margin. The unit shown in FIGS. 7 to 10 is a multilayer capacitor without side margins. The unit shown in FIGS. 11 to 16 is a multiple multilayer capacitor, while the unit shown in FIGS. 17 to 25 is a multilayer feed-through capacitor.

The units as thus described are quite advantageous in many respects, particularly in that they may be made in miniature or very small sizes.

The metallized ceramic sheets are stacked in green state in contrast with the usual method of stacking fired metallized ceramics to obtain high capaciies.

It is almost impossible to stack fired ceramic sections with thicknesses of 3 mils or less because of their brittleness.

The pressure applied to the stacked green ceramic produces very intimate contact between the sheets, thus yielding a compact, integral structure of great strength and ruggedness after the firing operation, giving high density and extremely high capacity per unit volume.

Because of the high density obtained by the applied high pressure, the piece is easy to vitrify and will have a porosity approaching "0," which is very essential for a ceramic dielectric to perform reliably.

The high pressure also compresses the sections thinner than their original thickness before compression, especially in the area occupied by the electrode pattern. The thickness of the section is reduced at least by the thickness of the electrode which sinks into the dielectric, further increasing the capacity.

Small imperfections in the sheet, as small bubbles or holes, are healed by the compacting pressure.

The defect-free sheet contributes greatly to the reliability of the capacitor.

The capacitor without side margins can then be calibrated to exact capacity by grinding one or more edges and removing some of the electrode and dielectric.

This process also permits the construction of capacitors with irregular shapes such as those with certain notches on the sides for modulaor construction. This is only made possible by the faithful reproduction of the special shape in the punching operation and in the subsequent compression.

Between each two sheets there will be an electrode which will alternate in shape, form, size and tabs so that one edge of each alternate electrode will be available at one side and the other at the other side when the punching is accomplished.

As many changes could be made in the above method and product, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A process of forming a ceramic capacitor of extremely small size as compared to capacity from ceramic materials, which comprises first forming and drying thin coherent flexible green ceramic sheets containing a plastic binder from a slip devoid of air bubbles, by casting, electroding faces of these sheets with a refractory metal which does not oxidize at the firing temperature of the ceramic composition so that the electrode areas are out of register and are exposed alternately at different edges, punching the sheets so as to form plates of desired dimensions with the alternate edges exposed on different sides of the plate and stacking such plates, *providing intimate contact between the sheets by* subjecting the stack to [a] pressure [of about 10 to 20 tons per square inch] while confining lateral displacement of such stack, and thereupon firing the stack at a maturing temperature of between 2,100 to 2,600° F. to burn off the binder and mature the sheets, conducting material being applied along the exposed edges of the electrodes to give parallel connections, and after firing, applying leads to form the complete capacitor.

2. A process of forming a ceramic capacitor of extremely small size as compared to capacity from ceramic materials, which comprises first forming and drying thin coherent flexible green ceramic sheets containing a plastic binder from a slip devoid of air bubbles by casting, electroding faces of these sheets with a refractory metal which does not oxidize at the firing temperature of the ceramic composition to form alternate areas of electrodes with oppositely directed tabs and non-metallized margins around said areas, stacking the sheets with the tabs alternately projecting to opposite sides punching the stack to form substantially rectangular plates with the tabs alternately projecting to opposite sides of the stack, with the rest of the metallized electrodes being separated from the sides of the stack by the margins, *providing intimate contact between the sheets by* subjecting the stack to [a] pressure [of about 10 to 20 tons per square inch] while confining lateral displacement of such stack, and thereupon firing at a maturing temperature between 2,100 to 2,600° F., to burn off the binder and mature the sheets, and after firing connecting the cut tabs of the electrodes to give parallel connections, and soldering on to form the complete capacitor.

3. A process of forming a ceramic capacitor of extremely small size as compared to capacity from ceramic materials, which comprises first forming and drying thin coherent flexible green ceramic sheets containing a plastic binder from a slip devoid of air bubbles, by casting, electroding faces of these sheets with a refractory metal which does not oxidize at the firing temperature of the ceramic composition to form alternating annular areas and circular areas with edges inside of said annular areas, punching the sheets to form discs with annular areas projecting to the outer edges of the stack and the circular areas being margined inside of the edges of the discs and stacking said discs, *providing intimate contact between the sheets by* subjecting the stack to [a] pressure of [about 10 to 20 tons per square inch] while confining lateral displacement of such stacks, centrally punching a hole through the circular areas without contacting the inside of the annular areas and firing at a maturing temperature of between 2,100 to 2,600° F., to burn off the binder and mature the discs, the exposed edges on the outside of the stack and in the hole through the stack being connected in parallel and a central lead and an outside metal casing to form the complete capacitor being soldered in position.

4. A process of forming a ceramic capacitor of extremely small size as compared to capacity from ceramic materials, which comprises first forming and drying thin coherent flexible green ceramic sheets containing a plastic binder from a slip devoid of air bubbles, by casting, cutting into strips, electroding opposite faces of these strips with a refractory metal which does not oxidize at the firing temperature of the ceramic composition alternately first to one edge with a margin at the opposite edge, and then to the opposite edge with a margin at the first edge, stacking the strips with alternating margins at contacting faces in at least a multiple of two, punching the sheets in a rectangular shape so as to form a stack with opposite sides having alternate electrode edges exposed, *providing intimate contact between the sheets by* subjecting the stack to [a] pressure [of about 10 to 20 tons per square inch] while confining lateral displacement of such stack, and thereupon firing at a maturing temperature of between 2,100 to 2,600° F. to burn off the binder and mature the sheets parallel connections being established on opposite sides of the stack, and leads being soldered on to form the complete capacitor.

5. A process of forming a ceramic capacitor of extremely small size as compared to capacity from ceramic materials, which comprises first forming and drying thin coherent flexible green ceramic sheets containing a plastic binder from a slip devoid of air bubbles, by casting, electroding faces of these sheets to form alternate electrode areas with tabs of the alternate sets projecting at angles to one another on alternate sheets, one alternate set consisting of continuous ground electrodes and the other alternate set consisting of spaced apart parallel strip electrodes and the electrode areas being formed with a refractory metal which does not oxidize at the firing temperature of the ceramic composition, forming a stack of such sheets and punching the sheets in a shape so as to form rectangular plates and exposing the alternate tabs at different sides of the rectangular stack, *providing intimate contact between the sheets by* subjecting the stack to [a] pressure [of about 10 to 20 tons per square inch] while confining lateral displacement of such stack, and thereupon firing at a maturing temperature of between 2,100 to 2,600° F. to burn off the binder and mature the sheets, electrical connections being established in parallel along said adjacent sides and leads being soldered on to form the complete capacitor.

6. The process of claim 1, the parallel connections being formed in the green state.

7. The process of claim 1, the parallel connections being formed after firing.

References Cited

The following references, cited by the Examiner, are of record in the patented file of this patent or the original patent.

UNITED STATES PATENTS

| | | | |
|---|---|---|---|
| 3,163,917 | 1/1965 | Bilsing | 29—25.42 |
| 3,133,338 | 5/1964 | Fabricius et al. | 29—25.42 |
| 3,151,382 | 10/1964 | McHugh | 29—25.42 |
| 2,085,092 | 6/1937 | Furth | 29—155.61 |
| 2,437,212 | 3/1948 | Schottland | 317—261 |
| 2,736,080 | 2/1956 | Walker et al. | 317—258 |
| 2,972,570 | 2/1961 | Haas | 317—258 X |
| 3,004,197 | 10/1961 | Rodriguez et al. | 317—242 |
| 3,137,808 | 6/1964 | Coda | 317—242 |

FOREIGN PATENTS

| | | |
|---|---|---|
| 693,455 | 7/1953 | Great Britain. |
| 722,488 | 1/1955 | Great Britain. |

RICHARD H. EANES, JR., *Primary Examiner.*